2,965,671
PROCESS FOR PRODUCTION OF AMINO COMPOUNDS

Roy A. Hughes, Galveston, Tex., assignor to Monsanto Chemical Company, St. Louis, Mo., a corporation of Delaware No Drawing. Filed Apr. 22, 1957, Ser. No. 654,071

8 Claims. (Cl. 260—465.5)

The present invention relates to an improved method for the production of certain types of amino compounds. More particularly, it relates to the preparation of β-aminonitriles and β-aminoesters.

It is well known that valuable amino compounds can be obtained by the addition reaction effected between α,β-unsaturated nitriles and a nitrogen-reactive ammonia base such as ammonia, hydroxylamines, hydrazines, aliphatic, hydroaromatic or aromatic primary or secondary amines and polyamines of the same kind. Likewise, primary amines react readily with esters of α,β-unsaturated carboxylic acids such as methyl acrylate, for example, to yield β-aminopropionates. Generally, amines react with α,β-unsaturated acid derivatives of the acrylate type such as the lower aliphatic esters and nitriles of acrylic acid, methyacrylic acid and crotonic acid without the aid of a catalyst. However, in this addition reaction steric effects are very important and the size and branching of the alkyl groups have a definite influence on the reaction. Yields, for example, reported for the reaction of acrylonitrile with tert-butylamine have been considerably lower than for the other butylamines. This decrease in yield is even more pronounced with tert-octylamine where the use of elevated temperatures, extended reaction time, or basic catalysts have all failed to give yields above 30%. The use of an acidic catalyst to overcome this difficulty has been described but certain losses of the amine reactant must be tolerated if it is to be used. Theoretically, the amine can be recovered by reaction of the acid derivative with a stronger base. Practically, however, this represents an additional step in the process as well as an additional reactant, acid losses occur in the recovery step, and the distillation system for recovery of the product is complicated by the presence of salts.

I have now discovered that these difficulties in the prior art can be obviated and excellent yields of β-aminonitriles and β-aminoesters can be obtained directly from amines such as the tert-butylamine and tert-octylamine mentioned which are characterized by steric hindrance simply by employing water as a catalyst in the addition reaction between the amines and the α,β-unsaturated acid derivatives.

According to the invention, tert-carbinamines of the formula $$RR'R''CNH_2$$

wherein R, R' and R'' may be alike or different and are chosen from the group consisting of alkyl, cycloalkyl, aryl, alkaryl, and aralkyl radicals containing from 1 to 12 carbon atoms are reacted with a compound chosen from the group consisting of the lower aliphatic esters and nitriles of α,β-unsaturated acids in the presence of a catalytic amount of water to yield the corresponding β-aminonitriles or β-aminoesters.

The following examples are presented to illustrated the invention but are not to be construed as limiting it in any manner.

Example I

Two parallel series of runs were made in which tert-butylamine, tert-octylamine (2-amino-2,4,4-trimethylpentane), and tert-nonylamine, were reacted with acrylonitrile. The nonylamine employed was a mixture of isomers of essentialy tert-carbinamine structure obtained by the "Ritter" reaction of propylene trimer and hydrogen cyanide. In one series, precautions were taken to use anhydrous or substantially anhydrous reagents while in the other varying amounts of water were deliberately added in the reaction to determine its effect. The reactions were carried out in a 500-ml., round-bottomed, three-necked flask fitted with a 250-ml., dropping funnel, a thermometer, a stirrer, a reflux condenser and a heating mantle. The amine to be reacted was charged to the flask, stirred and heated to the temperature of the lowest boiling reactant, then the acrylonitrile was added drop-wise from the funnel over a period of approximately 15 to 50 minutes. After addition of the nitrile was completed, the reaction mixture was refluxed for a period of one hour. Thereafter it was cooled, transferred to a flask fitted with a 6-in. x 1-in. distillation column packed with glass beads and having a head which was cooled by circulating ice water, and distilled. Excess amine and acrylonitrile were removed at atmospheric pressure while the product aminonitrile was removed under vacuum (~0–15 mm. of Hg absolute). Conversion of acrylonitrile to the respective products, β-(tert-butylamino)propionitrile, β-(tert-octylamino)propionitrile, and β-(tert-nonylamino)propionitrile, was calculated in every case. Specific reaction conditions together with data obtained in the various runs are presented in the following table.

| Amine | Moles Amine/ Mole AN Fed | Percent $H_2O$ | Reaction Temp., ° C. | Amino Nitrile Product (g.) | Conv. (Percent) |
|---|---|---|---|---|---|
| t-Butyl  | 1.5/1.0 | 0 | 45–65 | 6.1 | 4.8 |
| Do | 1.5/1.0 | 3.4 | 45–65 | 97.2 | 77.1 |
| Do | 1.5/1.0 | 3.4 | 45–65 | 92.3 | 73.2 |
| Do | 1.5/1.0 | 10.0 | 45–64 | 120.4 | 95.5 |
| Do | 1.0/1.0 | 10 | 45–64 | 113.4 | 90 |
| t-Octyl | 0.75/0.75 | 0 | 82–87 | None | 0 |
| Do | 1/1 | 10.8 | 80–87 | 130.2 | 71.5 |
| t-Nonyl | 0.50/0.50 | 0 | 84–89 | None | 0 |
| Do | 0.50/0.50 | 11.3 | 84–89 | 26.3 | 26.8 |

Example II

Using apparatus as set up in Example I, 100 g. (1.0 mole) of methyl methacrylate, 73 g. (1 mole) of tert-butylamine and 10 g. of water were charged to the reaction flask. The mixture was heated to reflux temperature and refluxed for 6 hours (62–72° C.). After standing overnight at room temperature, the reaction mixture was subjected to distillation and 24 g. of methyl-(2-methyl-3-tert-butylamino)propionate was recovered representing a conversion of 13.9%. The product was identified by potentiometric titration and had a molecular weight of 172.5 (theoretical M.W.=173). During the reaction period the flask and condenser were covered with cloth to prevent light-catalyzed polymerization of the methyl methacrylate reactant. The same precaution was taken during the distillation step, no polymerization inhibitor being employed. It was observed that some polymerization of the ester had occurred.

Example III

The experiment of Example II was repeated with all reaction conditions and procedures identical except that dry reactants were employed and no water was added in the reaction. No methyl-(2-methyl-3-tert-butylamino)propionate was recovered at all from the distillation step in this case.

Example IV

According to the procedure of Example I, one mole of ethyl crotonate is reacted with 3-cyclohexyl-3-aminopentane in the presence of 0.45 mole of water to give a good yield of ethyl-3-methyl-4-aza-5-ethyl-5-cyclohexyl heptanoate. The same reaction between the dry amine and the dry ester in which no water is added to the reaction mixture does not yield any appreciable quantity of the heptanoate.

The data of Examples 1–4 demonstrate conclusively that water acts as a catalyst in the addition reaction of so-called "hindered" amines and nitriles and esters of $\alpha,\beta$-unsaturated acids resulting in significantly increased yields over a given reaction period. It should be pointed out that the reaction period given in the examples is not intended to represent the optimum but was arbitrarily chosen to serve as only a standard or base for comparative purposes to illustrate the effect of water in the reaction. It appears that the catalytic effect of water is probably due to its ability to aid in the transfer of protons.

Some variations may be made in reaction conditions from those given in the example without departing from the scope of the invention. Other suitable amines in addition to those mentioned in the examples which may be reacted according to the process of the invention include, for example, 3-methyl-3-aminohexane, 3-ethyl-3-aminopentane, tert-dodecylamine, tert-pentadecylamine, 2 - cyclohexyl - 2 - aminobutane, 2 - cyclopentyl-2-aminopropane, 2-phenyl-2-aminopropane, 2-benzyl-2-aminohexane, 2-tolyl-2-aminobutane, 1,1-di-(p-methylphenyl) - 1 - aminoethane, 1 - cyclohexyl - 1 - benzyl-1-aminopropane, and the like. Likewise, in addition to those given in the examples, suitable nitriles and lower aliphatic esters of $\alpha,\beta$-unsaturated acids include methacrylonitrile, crotonitrile, methyl acrylate, ethyl acrylate, propyl acrylate, ethyl methacrylate, propyl crotonate, methyl crotonate, and the like. "Lower aliphatic esters" is taken to mean those esters in which the alcohol portion of the ester is an alkyl group containing from 1 to 4 carbon atoms.

While it is preferred to employ stoichiometric quantities of the reactants, quantities in slight excess of the theoretical may be employed. No advantage is seen in using large excesses of either reactant while some difficulties might be created in certain instances.

The amount of water employed as catalyst may vary over a wide range from as little as 0.1% to as much as 15% by weight of the amine. Preferably, from about 3% to about 10% water provides most effective catalysis of the reaction.

Generally, the reaction proceeds at temperatures from about room temperature to about 150° C. In some cases, it can be conducted at temperatures as low as 0° C. and as high as 200° C. but in any case reaction temperature is maintained below the decomposition temperatures of the reaction components. At room temperature or below, an extended period of time may be required for reaction, so it is preferred to conduct the reaction at temperatures between about 40 and 100° C.

The aminonitriles produced by the invention are useful as chemical intermediates. They may be readily reduced to polyamines and the amino group therein is available for reaction with acids, alkylene oxides, alkyl acid chlorides, and the like for the preparation of many useful products such as textile assistants, solvents, etc. The aminoesters lead to detergents, emulsifying agents, surfactants, flotation agents, and the like.

What is claimed is:

1. The process for producing $\beta$-aminonitriles and $\beta$-aminoesters which comprises reacting a tert-carbinamine of the formula $$RR'R''CNH_2$$

wherein R, R' and R" are chosen from the group consisting of alkyl, cycloalkyl, aryl, alkaryl, and aralkyl hydrocarbon radicals containing from 1 to 12 carbon atoms with a compound selected from the group consisting of the nitriles and lower alkyl esters of acrylic acid, methacrylic acid, and crotonic acid at a temperature in the range from about 0° C. to about 150° C. in the presence of a catalytic quantity of water, said quantity of water being in the range from about 0.1% to about 15% by weight of the tert-carbinamine.

2. The process for producing $\beta$-aminonitriles and $\beta$-aminoesters which comprises reacting a tert-carbinamine of the formula $$RR'R''CNH_2$$

wherein R, R' and R" are unsubstituted alkyl radicals containing from 1 to 12 carbon atoms with a compound selected from the group consisting of the nitriles and lower alkyl esters of acrylic acid, methacrylic acid, and crotonic acid at a temperature in the range from about 0° C. to about 150° C. in the presence of a catalytic quantity of water, said quantity of water being in the range from about 0.1% to about 15% by weight of the tert-carbinamine.

3. A process for the production of aminonitriles which comprises reacting a tert-carbinamine of the formula $$RR'R''CNH_2$$

wherein R, R', and R" are chosen from the group consisting of alkyl, cycloalkyl, aryl, alkaryl, and aralkyl hydrocarbon radicals containing from 1 to 12 carbon atoms with acrylonitrile at a temperature in the range from about 0° C. to about 150° C. and in the presence of an amount of water in the range from about 0.1% to about 15% by weight of the tert-carbinamine.

4. A process for the production of $\beta$-(tert-butylamino) propionitrile which comprises reacting tert-butylamine with acrylonitrile at a temperature in the range from about 40° to about 100° C. and in the presence of an amount of water in the range from about 3% to about 10% by weight of the tert-butylamine.

5. A process for the production of $\beta$-(tert-octylamino) propionitrile which comprises reacting tert-octylamine with acrylonitrile at a temperature in the range from about 40° to about 100° C. and in the presence of an amount of water in the range from about 3% to about 10% by weight of the tert-octylamine.

6. A process for the production of $\beta$-(tert-nonylamino) propionitrile which comprises reacting tert-nonylamine with acrylonitrile at a temperature in the range from about 40° to about 100° C. and in the presence of an amount of water in the range from about 3% to about 10% by weight of the tert-nonylamine.

7. A process for the production of $\beta$ amino esters which comprises reacting a tert-carbinamine of the formula $$RR'R''CNH_2$$

wherein R, R', and R" are unsubstituted alkyl radicals containing from 1 to 12 carbon atoms with a compound selected from the group consisting of the lower alkyl esters of acrylic acid, methacrylic acid, and crotonic acid at a temperature within the range from about 0° C. to about 150° C. in the presence of an amount of water in the range from about 0.1% to about 15% by weight of the tert-carbinamine.

8. A process for the production of methyl(2-methyl-3-tert-butylamino)propionate which comprises reacting methyl methacrylate with tert-butylamine at a temperature in the range from about 40° to about 100° C. and in the presence of an amount of water in the range from about 3% to about 10% by weight of the tert-butylamine.

References Cited in the file of this patent

UNITED STATES PATENTS

| | | |
|---|---|---|
| 1,992,615 | Hoffmann et al. | Feb. 26, 1935 |
| 2,448,013 | Buc et al. | Aug. 31, 1948 |

OTHER REFERENCES

Tarbell et al.: J.A.C.S. 68, 1217–19 (1946).